United States Patent

Want et al.

[11] Patent Number: 6,122,520
[45] Date of Patent: Sep. 19, 2000

[54] SYSTEM AND METHOD FOR OBTAINING AND USING LOCATION SPECIFIC INFORMATION

[75] Inventors: Roy Want, Los Altos; Mark David Weiser, Palo Alto; Anthony George LaMarca, Redwood City; David Goldberg, Palo Alto, all of Calif.

[73] Assignee: Xerox Corporation, Stamford, Conn.

[21] Appl. No.: 09/023,116

[22] Filed: Feb. 13, 1998

[51] Int. Cl.[7] .............................. H04Q 7/20; G01C 21/00; G06G 7/78
[52] U.S. Cl. .......................... 455/456; 455/457; 701/211
[58] Field of Search .................................... 455/456, 457, 455/66, 344; 342/385, 386, 450, 451; 701/207, 211

[56] References Cited

U.S. PATENT DOCUMENTS

| | | | |
|---|---|---|---|
| 5,519,760 | 5/1996 | Borkowski et al. | 455/404 |
| 5,537,460 | 7/1996 | Holliday, Jr. et al. | 455/435 |
| 5,570,412 | 10/1996 | LeBlanc | 455/456 |
| 5,598,572 | 1/1997 | Tanikoshi et al. | 712/30 |
| 5,684,859 | 11/1997 | Chanroo et al. | 455/433 |
| 5,732,074 | 3/1998 | Spaur et al. | 370/313 |
| 5,767,795 | 6/1998 | Schaphorst | 340/988 |
| 5,867,110 | 2/1999 | Naito et al. | 340/995 |
| 5,870,686 | 2/1999 | Monson | 701/1 |
| 5,938,721 | 8/1999 | Dussell et al. | 701/211 |
| 5,948,041 | 9/1999 | Abo et al. | 701/207 |
| 6,104,090 | 1/2000 | Rosen et al. | 340/905 |

OTHER PUBLICATIONS

Jim Spohrer, "New Paradigms for Using Computers", 1997; retrieved on Feb. 12, 1998 from http:/www.almaden.ibm-.com/almaden/npuc97/1997/spohrer.htm.

*Primary Examiner*—Dwayne D. Bost
*Assistant Examiner*—Erika A. Gary
*Attorney, Agent, or Firm*—Oliff & Berridge, PLC

[57] ABSTRACT

A location information system uses a positioning system, such as the civilian Navstar Global Positioning System (GPS), in combination with a distributed network. The location information system includes a radio transceiver for communicating to the distributed network and a GPS receiving system. The GPS receiving system receives a signal from the GPS and converts it into a coordinate entry. The coordinate entry is transmitted to the distributed network for retrieval of corresponding location specific information. The location specific information may reside on a web page. The coordinate entry may be incorporated into the web page address that supports the coordinate entry or linked to an existing web page associated with the coordinate entry. The web page and associated information is displayed. Bar code labels, infrared beacons and other labeling systems may also be used in the location information system in place of or in addition to the GPS receiving system to supply location identification information.

28 Claims, 7 Drawing Sheets

SYSTEM AND METHOD FOR OBTAINING AND USING LOCATION SPECIFIC INFORMATION

BACKGROUND OF THE INVENTION

1. Field of Invention

The invention generally relates to obtaining information relating to a specific location using a positioning system. More particularly, the invention relates to a system and method for obtaining location specific information about a particular location using a distributed network in combination with the positioning system.

2. Description of Related Art

Many people travel throughout the world or even their own local communities without realizing the wealth of information concerning their surroundings. For example, people travel in their own communities without knowing what buildings may be of historical significance or what shopping center may have a specific store or whether any store in the shopping center sells a specific product.

In many instances, people rely on brochures or other literature in order to familiarize themselves with their surroundings. These brochures may include tourist/travel brochures, shopping mall directories/maps or other similar literature. However, these brochures are not very informative because they contain limited amounts of information. The amount of information is limited due to factors such as high distribution costs. Accordingly, relatively little money is available for research, writing and printing. Thus, much information that would otherwise be informative to the public may not be included in these brochures.

This lack of information often results in ineffective advertising for businesses. The public is also unable to effectively obtain adequate information about their surroundings. For example, a business may not be able to provide the consumer with a list of products sold in a particular store. Similarly, a local historical building may not be able to provide the public with effective information concerning the significance of the historical site. Information concerning (i) local wildlife and vegetation, (ii) locations of shopping centers, (iii) government information, and many other types of information may also be limited or non-existent.

However, many entities, such as stores, historical sites, and/or multi-national businesses now utilize distributed networks, such as the Internet and, more particularly, the World Wide Web portion of the Internet, to provide the public with useful information. For example, information about a historical site, such as a Civil War battlefield, may be disseminated via the World Wide Web and accessed though commercial Internet service providers (ISPs). The World Wide Web also provides the public with countless amounts of other information, such as business data, stock quotes or official government information.

However, a user will not have access to the desired information unless they manually input a web address or uniform resource locator (URL) associated with a particular web page. In these cases, it may be difficult to retrieve the web page because the URL may be difficult to locate, even with the sophisticated search engines currently available. Also, the web address may be very long which may result in a mistake when entering the web address.

Furthermore, when attempting to find location information about specific locations, a user may not know the "keywords" or other pertinent information in order to extract the desired information relating to that location. For example, a person may want information concerning local vegetation or wildlife, but is unable to define an adequate search to find that specific information.

SUMMARY OF THE INVENTION

This invention provides a system and method that combines a positioning system, for example, the Navstar Global Positioning System (GPS), with a distributed network, such as the Internet, to provide real-time location specific information. That is, the positioning system provides a signal that is converted into a coordinate entry (e.g., specific latitude and longitude coordinates). The system and method of this invention then references the coordinate entry to a particular "web page" associated with the coordinate entry.

The location information system preferably comprises a computer or personal digital assistant (PDA) and supports a radio connection and a positioning system receiving system. The positioning system receiving system receives signals from a set of positioning system transmitters, such as a set of satellites when using the GPS. The signals are converted into a coordinate entry by the positioning system receiving system and transmitted via a transmission to a server on the distributed network. The coordinate entry may be combined with a URL to make a unique URL that references a web page on a predetermined server for a particular web page that describes that location. The coordinate entry may also, for example, link to an existing web page on the distributed network associated with the coordinate entry. The web page and associated information, such as historical information, local areas of interest, shopping centers and the like, are transmitted to the location information system and displayed.

Printed label codes and other labeling systems can also be used with the location information system. In one embodiment, bar code labels may be provided on various stores, public buildings, exhibition centers, statutes and the like. The computer or PDA is provided with a bar code scanner for scanning the bar code on the bar code labels. The system then decodes the bar code to obtain the coordinate entry or URL for the associated web page. The coordinate entry is provided to the distributed network, which either incorporates the coordinate entry into a URL referencing a web page on a predetermined node which contains the location specific information or provides a "hyperlink" to a preexisting web page located on a separate node on the distributed network. Alternatively, infrared beacons may be used to provide the coordinate entry or URL to the location information system via an infrared detector. In this case, the location information system receives the infrared signals from a short distance (up to approximately 25 feet). The location information system then decodes the signals into the coordinate entry or the URL. The location information system then transmits the coordinate entry or URL to the distributed network via a transmission, such as a radio transmission. A web page associated with the coordinate entry is then retrieved and displayed on the computer or PDA.

The location information method preferably includes receiving signals from the positioning system transmitters and converting the signals to a coordinate entry. The coordinate entry is then transmitted to the distributed network. Web pages residing on the distributed network and having an associated coordinate entry are then retrieved based on the coordinate entry transmitted to the distributed network. The web pages are then displayed by the location information system.

These and other aspects and salient features of the invention will be described in or are apparent from the following detailed description of preferred embodiments.

BRIEF DESCRIPTION OF THE DRAWINGS

Preferred embodiments of the invention will be described in conjunction with the following drawings, in which.

DETAILED DESCRIPTION OF PREFERRED EMBODIMENTS

Distributed networks, such as the Internet and other private and commercial distributed networks are a source of useful information. This information varies from advertisements to educational information to business data. This information is typically resident on a particular web page having a unique URL or address that is provided on the World Wide Web, for example. For a user to obtain this information, the user either enters into the computer a unique URL for retrieving the web page or certain keywords in order to search for the web page using well-known search engines.

Positioning systems, such as the civilian service provided by Navstar Global Positioning System (GPS), provide latitudinal and longitudinal information on the surface of the earth to an accuracy of approximately 300 feet. The GPS may also provide information concerning altitude. When combined with accurate location references, such as differential GPS, an accuracy of better than three feet may be achieved. This information may be obtained using a positioning system receiver and transmitter, as is well known in the art. For purposes of this application, the civilian service provided by Navstar Global Positioning System (GPS) will be discussed with reference to the instant invention. However, other positioning systems such as LORAN and the like are also contemplated for use with the present invention.

In order for the GPS to properly provide location identification information (e.g., a coordinate entry), the GPS comprises several transmitters, e.g., satellites, each having a clock synchronized with respect to each other. The ground stations communicate with GPS satellites and ensure that the clocks remain synchronized. The ground stations also track the GPS satellites and transmit information so that each satellite knows its position at any given time. The GPS satellites broadcast "time stamped" signals containing the satellites' positions to any GPS receiver that is within the communication path and is tuned to the frequency of the GPS signal. The GPS receiver also includes a time clock. The GPS receiver then compares its time to the synchronized times and the location of the GPS satellites. This comparison is then used in determining an accurate coordinate entry.

Figure 1:
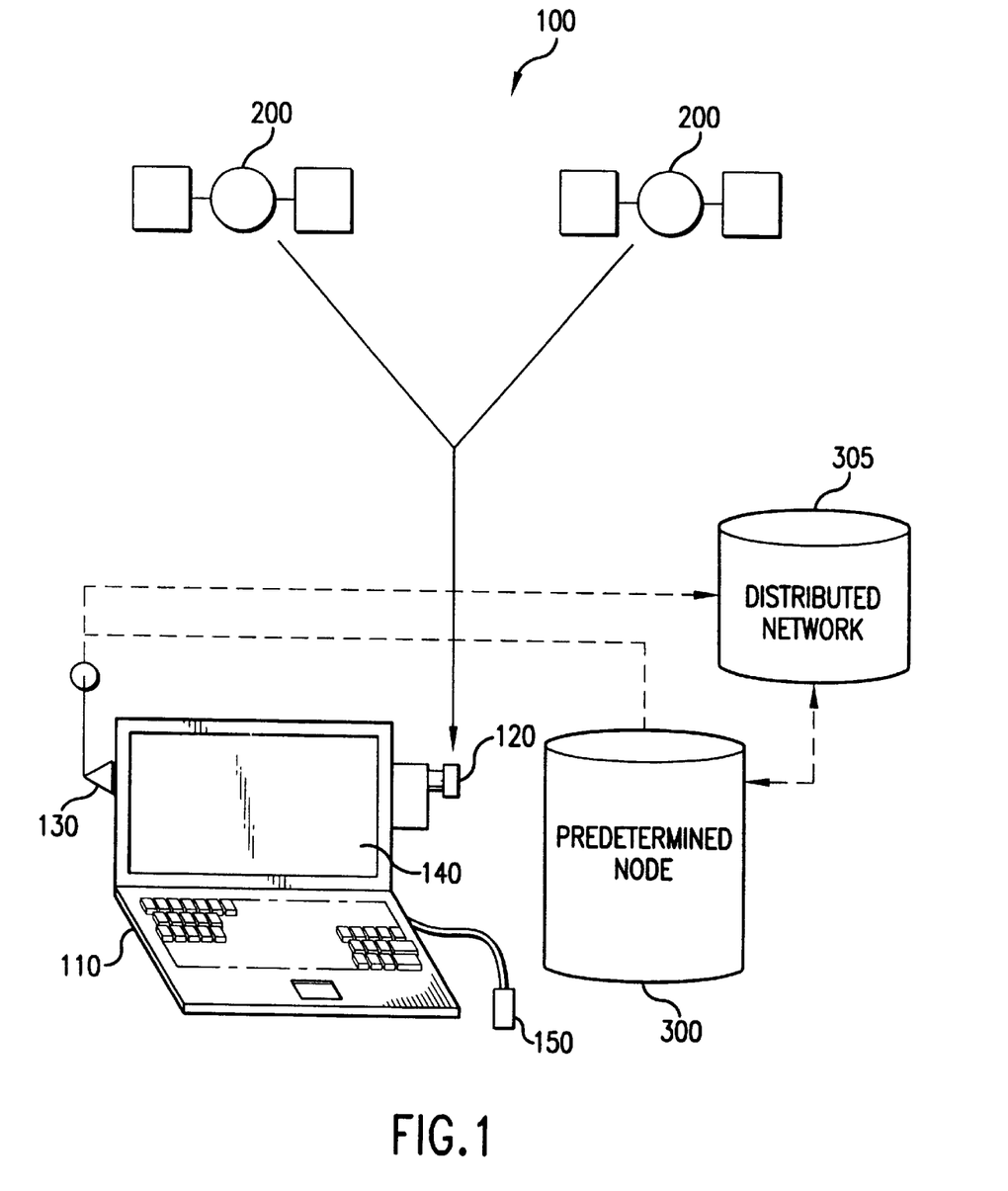
FIG. 1 shows one embodiment of the location information system of this invention.

FIG. 1 shows one embodiment of a location information system 100. As seen in FIG. 1, the location information system 100 includes a computer or personal digital assistant (PDA) 110, a GPS receiver 120 and a radio transmitter/receiver, e.g., transceiver 130. The GPS receiver 120 receives signals from three or more GPS transmitters 200 and converts the signals to a specific latitude and longitude (and in some cases altitude) coordinate entry, as described above. The GPS receiver 120 provides the coordinate entry to the computer 110 and the transceiver 130 transmits the coordinate entry, preferably via a radio network, to a predetermined node 300 or other node on a distributed network 305. Alternatively, the coordinate entry is transmitted to the distributed network 305 over a wired connection to the computer 110 (not shown).

Information associated with the coordinate entry defining a specific location is then transmitted to the computer 110 via the transceiver 130 (i.e., by either a radio network or other wireless or wire communication link) and displayed on the display 140. Information about various locations is organized and stored on the distributed network 305 and is preferably organized as "web pages." The web pages or pointers to them are preferably stored on the predetermined node 300 of the distributed network 305. However, the web pages may also be stored at various other nodes on the distributed network 305 and may be associated with one or more coordinate entries corresponding to physical locations. The web pages may have, for example, an already existing URL, e.g., a proprietary pre-existing URL. Alternatively, coordinate information may be incorporated into an existing URL to form a unique URL. Further, the coordinate entry may also be the entire URL of the web pages. A client, either local or remote, may access the web pages preferably via a server on the predetermined node 300 of the distributed network 305.

In preferred embodiments, the location information system 100 transmits, via the transceiver 130, the coordinate entries directly to the predetermined node 300 of the distributed network 305 having the web pages associated with the coordinate entries residing thereon. In this case, the web pages and the coordinate entries are stored on the same node of the distributed network 305. Alternatively, the web pages and the coordinate entries may be stored on separate nodes of the distributed network 305.

In embodiments, when the coordinate entry is provided on a separate node distinct from the node or nodes storing the corresponding web pages, the location information system 100 provides a reference page on the predetermined node 300 of the distributed network 305. The reference page provides a "hyperlink" to a web page or pages located on separate nodes. In the case when the web page is located on a separate node, a directory list of names of all web pages associated with coordinate entries may be stored on the predetermined node 300. The directory page may then access the directory list in order to determine whether the web page associated with a particular coordinate entry resides on another node of the distributed network 305. In embodiments, the computer 110 transmits the hyperlink string and receives the web pages via the transceiver 130. The corresponding web pages residing on a separate node of the distributed network 305 may also be directly accessed from the predetermined node 300 and downloaded to the computer 110 via the radio transceiver 130 without the use of the hyperlinks. In embodiments, this may be provided by a common gateway interface script (CGI), as discussed below. The corresponding web pages provide the user with specific information associated with the coordinate entry representing that location.

The location information system 100 can also provide the user with a map of an area based on the coordinate entry. In this case, the location information system 100 is provided with a map database that is displayed on the display 140. The user points to and clicks on a specific location on the map using a mouse or other interactive device 150. The specific location is associated with one or more coordinate entries or a unique URL. The coordinate entries or URLs of interest are then transmitted to the predetermined node 300 for retrieval of a web page associated with those coordinate entries or URLs. Also, a directory page associated with several coordinate entries or URLs may be retrieved from the distributed network 305, as discussed above. As previously discussed, the directory page may list several web pages that are associated with at least one coordinate entry and provide links to the associated web pages. The retrieved web pages may provide location specific information or directions to specific locations of interest associated with the web pages.

The GPS receiver 120 of the location information system 100 is preferably a PCMCIA Pathfinder™ Card (with associated hardware and/or software) manufactured by Trimble Navigation Ltd., Sunnyvale, Calif., for receiving information from the GPS transmitters 200. This system is a fully integrated 8-channel parallel tracking PC card receiver that plugs into the computer 110. This system may also provide background maps on a display 140 of the computer 110. The GPS receiver 120 may also provide satellite tracking capabilities and other data collection functions.

The radio transceiver 130 of the location information system 100 is preferably a cellular modem radio. The radio transceiver 130 may work with a Ricochet™ Wireless Network system manufactured by Metricom, Inc. The Ricochet™ Wireless Network is a wide-area wireless system using spread-spectrum packet switching data technology operating in the 902–928 MHz RF spectrum. The radio transceiver 130 may also comprise other systems, such as a cellular digital packet data (CDPD) type radio transceiver.

Figure 2:
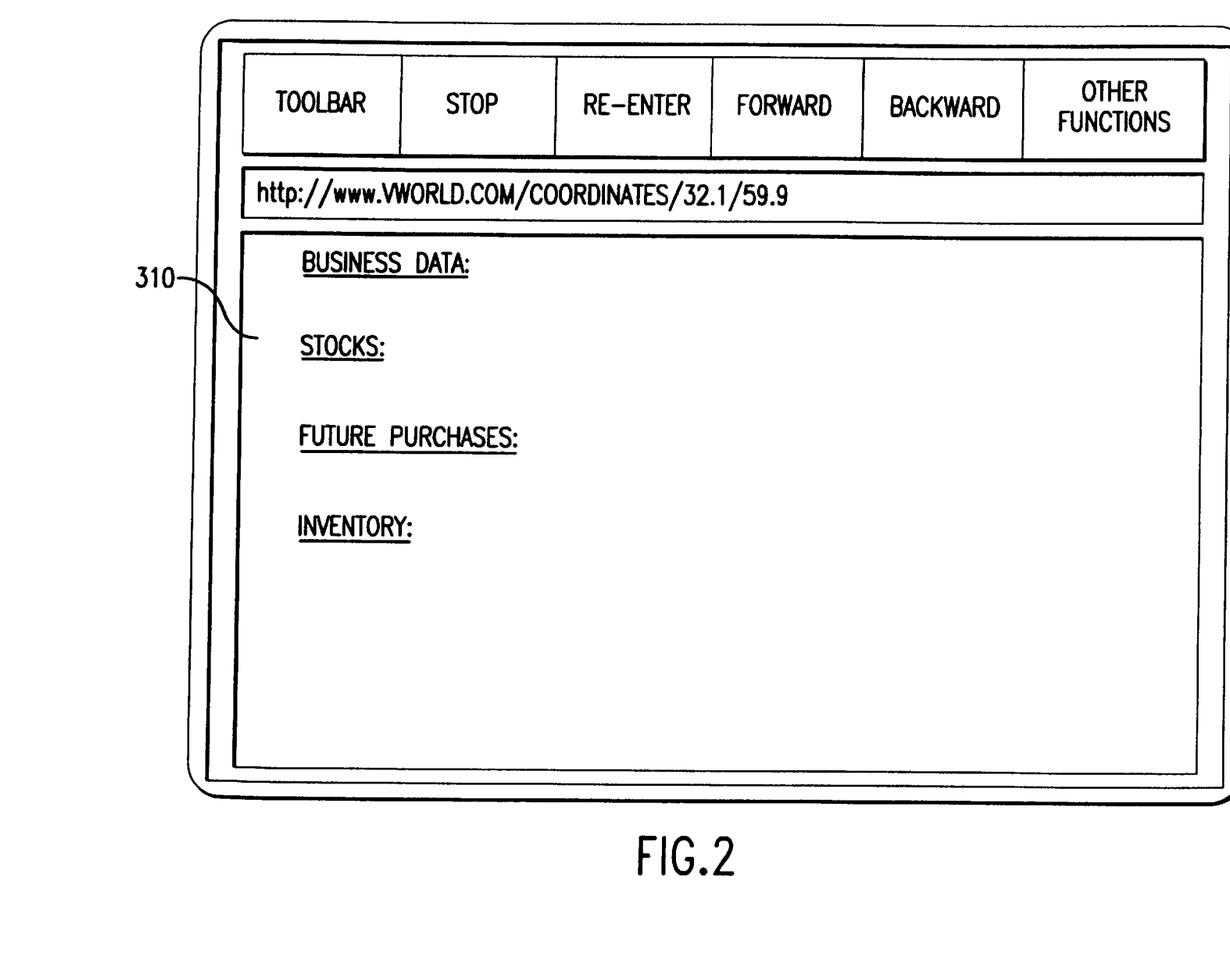
FIG. 2 shows a web page supporting a coordinate entry.

FIG. 2 shows a web page 310 corresponding to a particular coordinate entry. In preferred embodiments, the coordinate entry is referenced to a URL residing on the predetermined node 300. The web page 310 may have a unique or proprietary pre-existing URL, such as, for example, http://www.xerox.com, or may use the coordinate entry as part of the URL, such as, for example, http://www.vworld.com/coordinates/<lat>/<long>/<alt>. The coordinate entry may alternately be referenced to the directory page on the predetermined node 300 which links to an existing web page on a separate node of the distributed network 305. The directory page may also have a URL incorporating the coordinate entry such as, for example, http://www.vworld.com/coordinates/<lat>/<long>/<alt>.

The web page 310 of FIG. 2 has a URL of http://www.vworld.com/coordinates /<32.1>/<60.0>/<0>, where 32.1 is a latitude coordinate, 60.0 is a longitude coordinate and 0 is an altitude. In this example, the web page 310 shows business data such as stock quotes, inventory/product information, future expansion plans and other business data. The web page 310 may, of course, provide other information associated with a particular coordinate entry, such as historical site information including local vegetation information or the like.

Figure 3:
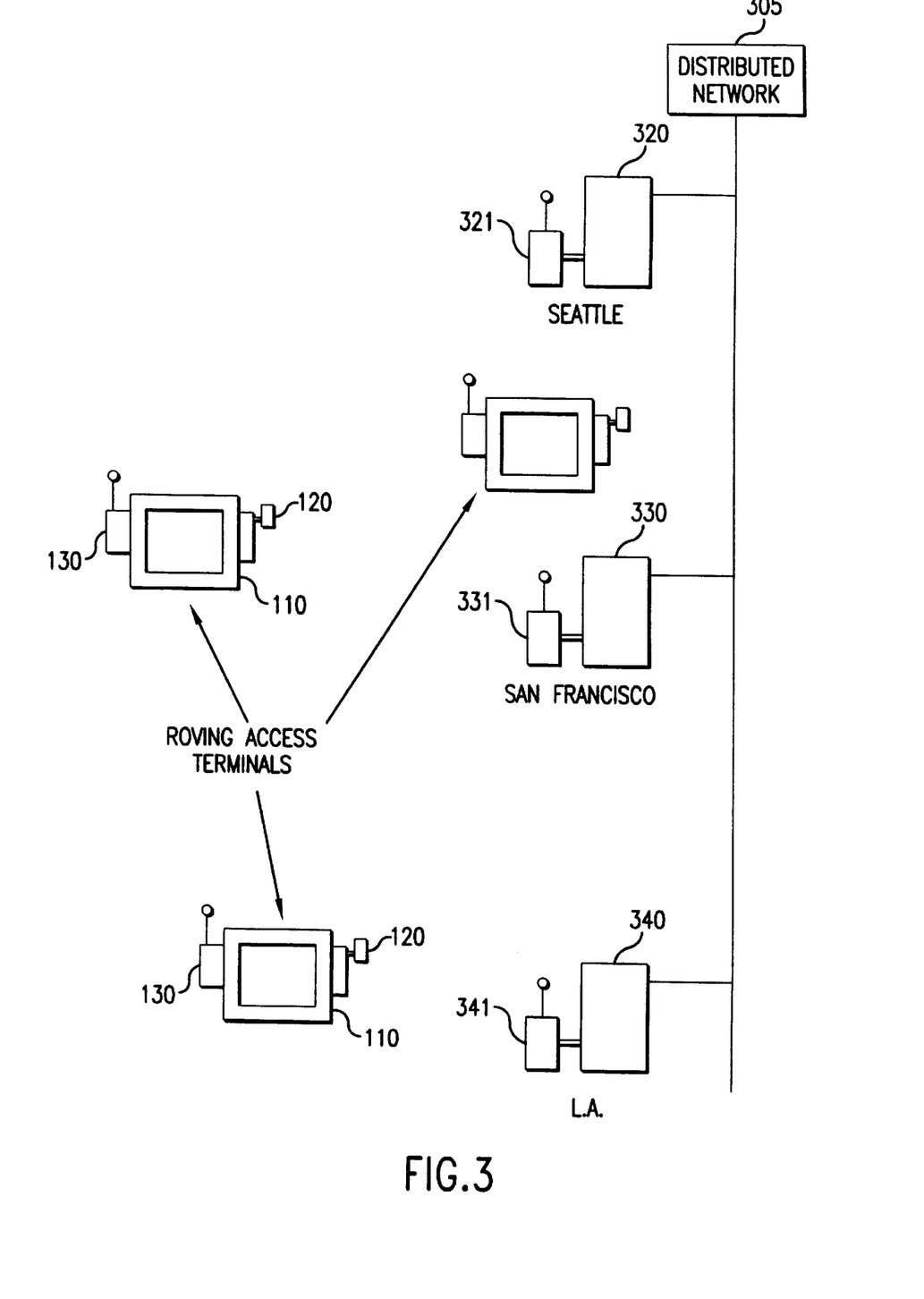
FIG. 3 shows the location information system accessing several nodes on a distributed network.

As shown in FIG. 3, the location information system 100 can access several nodes on the distributed network 305 at different times. In preferred embodiments, the distributed network 305 includes nodes 320, 330 and 340 that provide local access to the distributed network 300. The nodes 320, 330 and 340 provide a cost effective means for a user in the local area to obtain access to the distributed network 305. Also, in preferred embodiments, the nodes 320, 330 and 340 provide local access points for storing information about local points of interest. This also avoids the problem of having information "dragged " needlessly across the distributed network 305 and causing congestion within the distributed network 305.

The nodes 320, 330 and 340 provide various sources of information and are networked together so that a local node 320 in Seattle, for example, may access a remote node 330 in San Francisco. In preferred embodiments, the nodes 320, 330 and 340 include transceivers 321, 331 and 341, respectively, for receiving and transmitting data to and from each individual node 320, 330 and 340 and the computer 110 via the transceiver 130.

It should be appreciated that the GPS receivers 120 need to receive signals from the GPS transmitters 200. Thus, if the signals are blocked, the GPS receiver 120 may not be able to determine the coordinate entry. In order to avoid this problem, other techniques for providing a coordinate entry may be used by the location information system 100. These techniques may include, for example, printed ID labels (e.g., bar codes, vericodes, and other similar labels), infrared beacons or RF tags).

Figure 4:
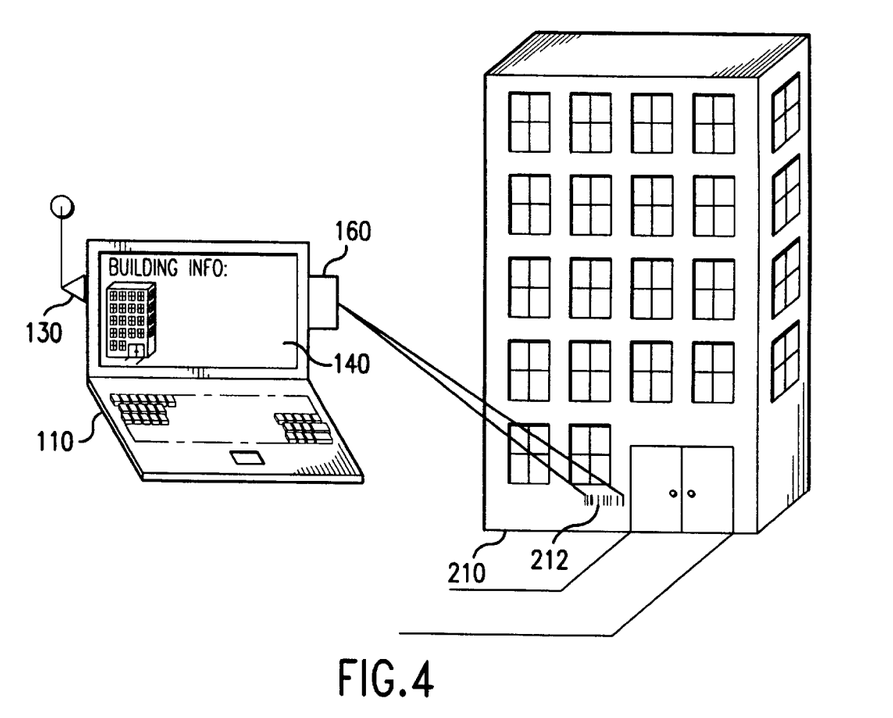
FIG. 4 shows another embodiment of the location information system using bar code labels as the information source.

FIG. 4 shows an embodiment of the location information system 100 using bar code labels to obtain location information. Other coding systems, such as the Vericode system, two-dimensional bar coding system and the like, are also contemplated for use with the present invention. In the embodiment of FIG. 4, a bar code label 212 may be placed on or in a building 210 or other location of interest. In preferred embodiments, the bar code label 212 encodes either the same longitudinal and latitudinal information that would be obtained from the GPS system or may directly encode a unique URL. The computer 110 also has, in place of or in addition to the GPS receiver 120, a bar code scanner 160 for scanning and decoding the bar code label 212. The bar code scanner 160 can be provided on a tether. The bar code scanner 160 reads the coordinate entry or unique URL from the bar code label 212. The coordinate entry or unique URL is transmitted to the distributed network 305 via the transceiver 130 and provided to the predetermined node 300, or to another node of the distributed network 305, and processes the location specific identification information as described above. The computer 110 downloads the web page(s) associated with the coordinate entry or unique URL for displaying on the display 140.

Figure 5:
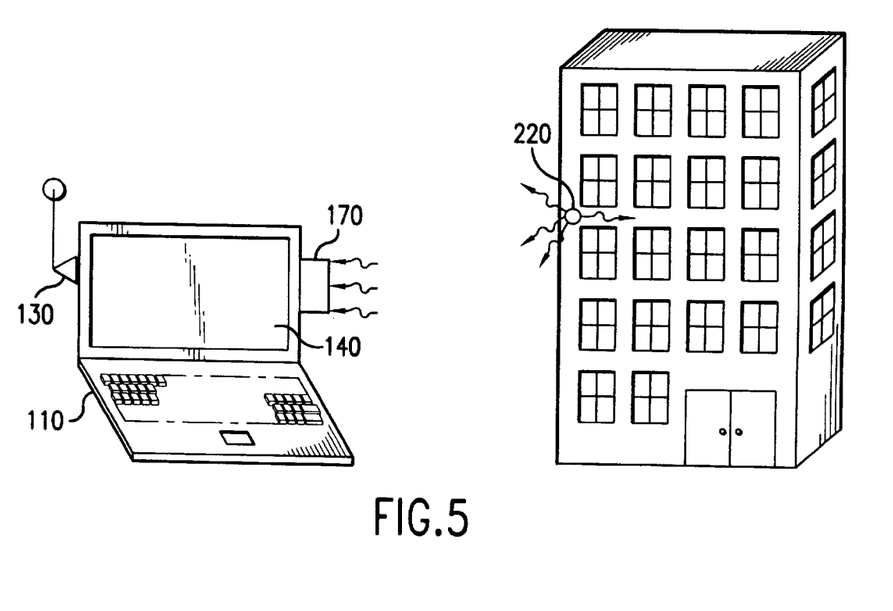
FIG. 5 shows another embodiment of the location information system using infrared beacons as the information source.

FIG. 5 shows an embodiment of the location information system 100 using as the location information source infrared beacons. Infrared beacons 220 may be used in a manner similar to the bar code labeling system described above. However, the infrared beacons 220 may be read from a much greater distance, and preferably approximately at least 25 feet. The IrDa standard can also be used, but a range of only approximately one meter may be obtained due to the limitations of such a system. The infrared beacons 220 are preferably placed on or in a building 210 or other location of interest. An IrDa or other interface 170, which is well known in the art, is provided on the computer 110 for sensing the infrared beacons 220. The infrared beacons 220 transmit either the coordinate entry or the unique URL that would otherwise be obtained from the bar code label 212. The information received from the infrared beacons 220 is used in the same manner as the information received from the bar codes 212. Additionally, radio frequency beacons could be used in place of the infrared beacons 220 to further extend the read distance. When using radio frequency beacons, the interface 170 is designed for the particular frequency and modulation techniques, well known in the art, used by the particular radio frequency beacons.

Figure 6:
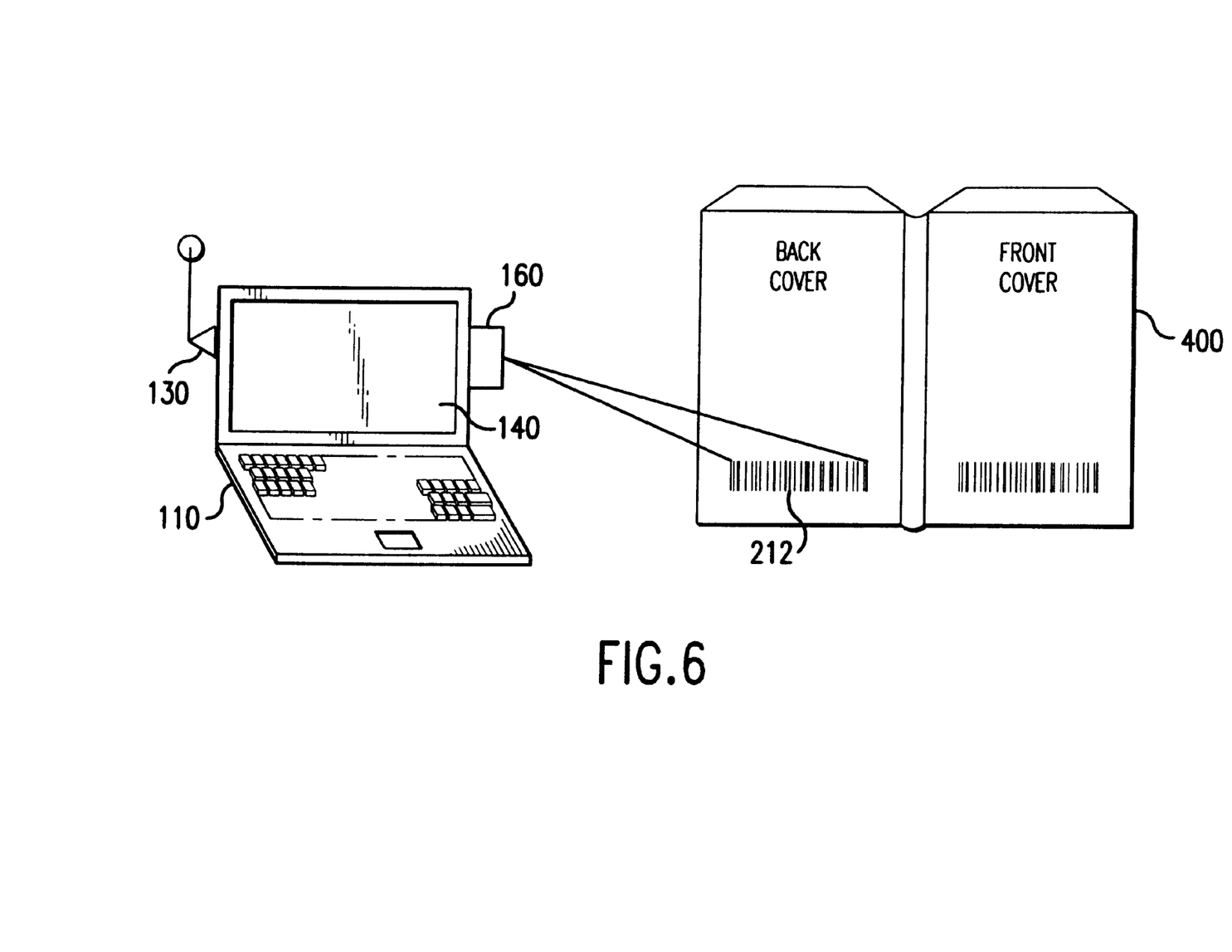
FIG. 6 shows printed material being electronically accessed using the location information system.

FIG. 6 shows printed material being electronically accessed using the embodiments of the location information system 100 shown in FIG. 1. This embodiment provides arbitrary connections to objects which have no location specific information but have been labeled with a unique URL. Specifically, by reusing the same infrastructure of the previous embodiments, labeled objects can be "linked" to associated web page(s). The infrared beacons 220 or the bar code labels 212 can also be used with objects that have associated manuals or other written materials 400 that are electronically available on the distributed network 305. That is, the user can electronically access an electronic version of its manual or other written material 400 by using information obtained from an infrared beacon 220 or bar code label 212. The infrared beacons 220 or the bar code labels 212 can also be used directly with manuals or other written materials 400 in order to electronically access an electronic version of those manuals or other written materials 400. This information specifically provides access to the electronic version of the manual or other written materials 400. The bar code label 212 may, for example, be located on a cover page or other predetermined page of the manual or other written material 400. The bar code scanner 160 reads a unique URL corresponding to the manual or other written material 400 from the bar code label 212 (placed on the object) and the transceiver 130 then transmits the URL to the distributed network 305. Web pages corresponding to the URL residing on the distributed network 305 are then provided to the computer 110 via the transceiver 130 and displayed on the display 140.

Figure 7:
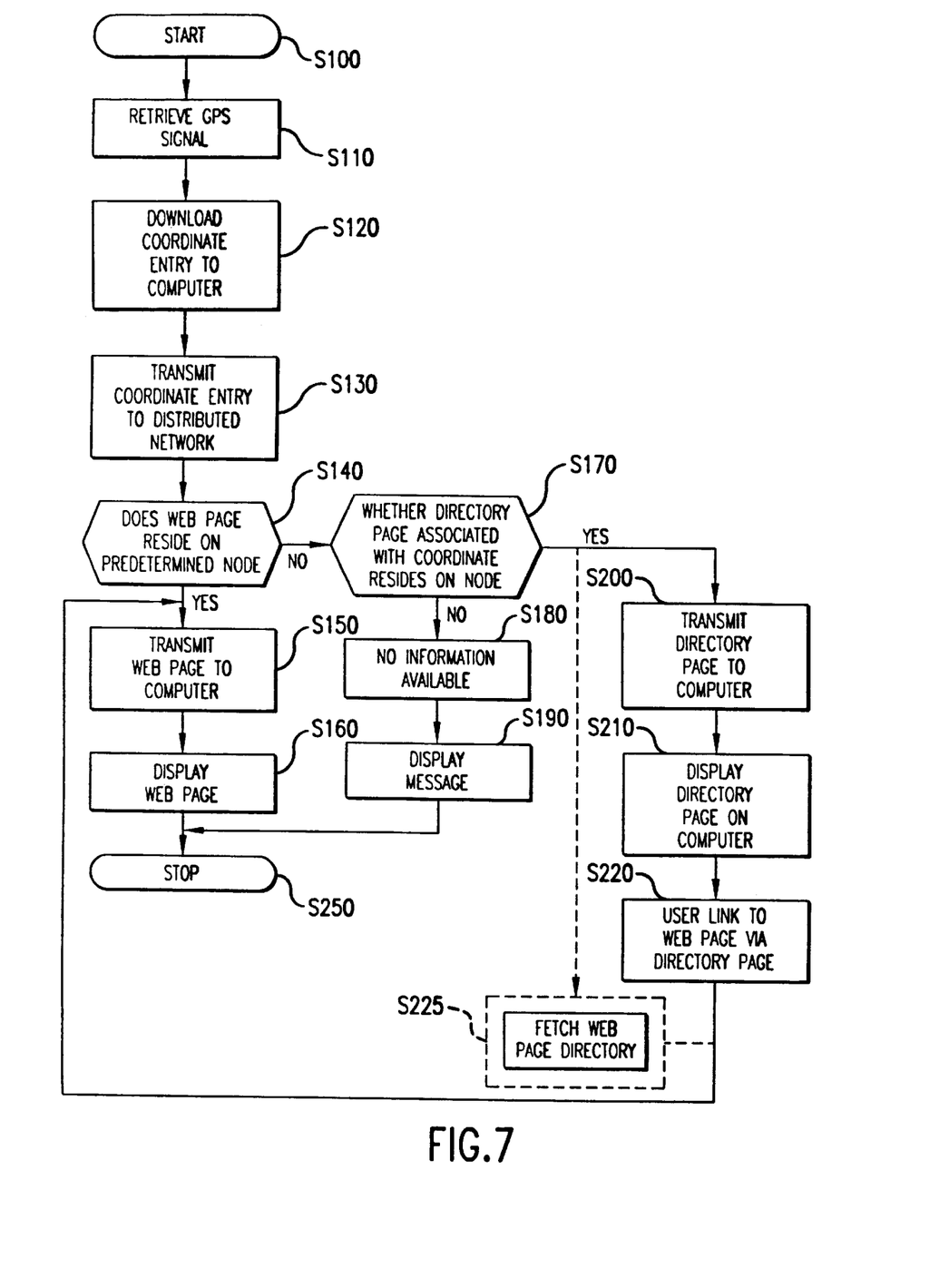
FIG. 7 shows a flow chart outlining a method of accessing location information.

FIG. 7 is a flowchart outlining one embodiment of the control routine using the GPS system. Control initiation can occur continuously as every new coordinate entry is received or alternatively through user input. Furthermore, the user can toggle between a continuously updating mode, where every new coordinate is transmitted to the distributed network 305 to retrieve the associated web page, a "one-off" mode where at a certain location the user activates the control sequence to retrieve information for one specific location, or a "continuous update hold mode" which is used in conjunction with the continuously updating mode and allows the user to browse additional in depth information within the fetched web page before continuing to the next newly fetched web page.

The control routine starts at step S100. At step S110, the GPS receiver 120 receives signals from the GPS transmitters 200. Then, at step S120, a coordinate entry associated with the GPS signal is downloaded to the computer 110 by the GPS receiver 120. Next, at step S130, the coordinate entry is transmitted to the distributed network 305 via the transceiver 130.

In step S140, the control routine determines whether a web page associated with the transmitted coordinate entry resides on a predetermined node 300 of the distributed network 305. In embodiments, the predetermined node 300 may provide the location information system 100 a gateway to the distributed network 305. If the web page resides on the predetermined node 300, the control continues to step S150. However, control jumps to step S170 if the web page does not reside on the predetermined node 300. In step S150, the web page is transmitted to the computer 110. Then, at step S160, the web page is displayed on the display 140. Control then jumps to step S250, where the control routine ends at step S250.

In step S170, the control routine determines whether a directory page associated with the coordinate entry resides on the predetermined node 300. If such a directory page does not reside on the predetermined node 300, control continues to step S180. Otherwise the control jumps to step S200. At step S180, the predetermined node 300 transmits a "No Information Available" or similar message to the computer 110. Then, at step S190, the message is displayed on the display 140. The control routine then jumps to step S250.

At step S200, the directory page is transmitted to the computer 110 via the transceiver 130. Then, at step S210, the directory page is displayed on the display 140. Next, at step S220, a user links to the web page on the distributed network 305 associated with the coordinate entry or a unique URL via the "hyperlinked" directory page. Again, at step S150, the web page is transmitted to the computer 110 via the transceiver 130. Then, at step S160 the web page is displayed on the display 140. The control routine then continues to step S250.

In alternate embodiments, if the control routine determines at step S170 that the associated directory page resides on the predetermined node 300, the control can instead jump to step S225. At step S225, the directory page fetches the web page directly from a remote node of the distributed network 305 prior to being transmitted to the computer 110. By using this procedure, steps S200–S220 may be eliminated. In this alternate embodiment, a CGI script may execute the steps necessary to determine whether the web page is on the predetermined node 300 or a remote node of the distributed network 305. Accordingly, the web page(s) are automatically retrieved from either the predetermined node 300 or a remote node of the distributed network 305. The web page is transmitted to the computer 110 via the transceiver 130 at step S150 and displayed on the display 140 at step S160.

Figure 8:
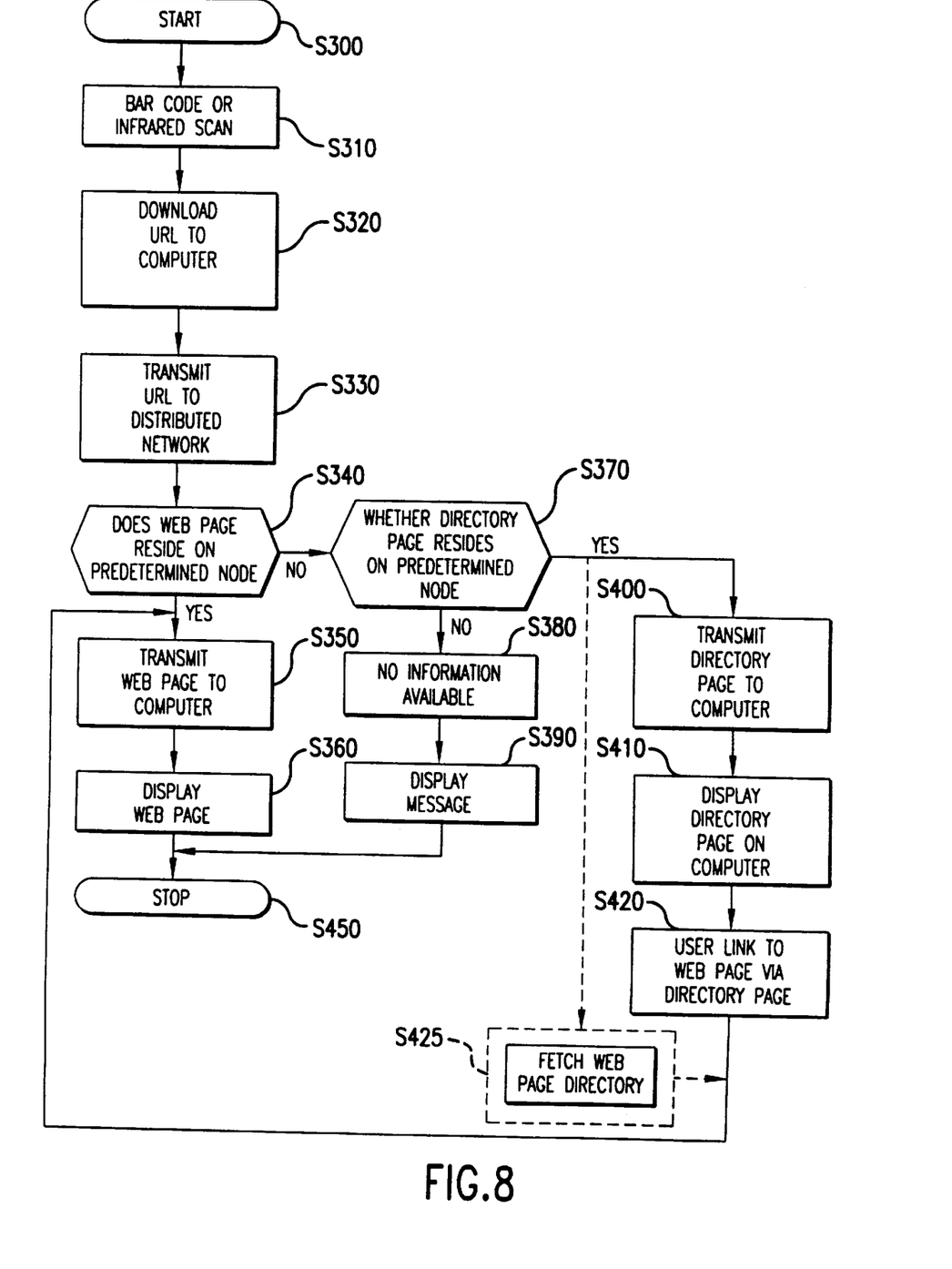
FIG. 8 shows another flow chart outlining a method of accessing location information.

FIG. 8 shows a flowchart outlining another embodiment of the control routine used when labeling techniques, such as bar codes, or infrared beacons provide the location specific information. The control routine starts at step S300. At step S310, the bar code scanner 160 or the IrDa interface 170 scans a URL from a bar code or an infrared device, respectively, or receives a URL from the bar code or infrared device, respectively. Then, at step S320, the URL is downloaded to the computer 110. Next, at step S330, the URL is transmitted to the distributed network 305 via the transceiver 130. At step S340, the control routine determines whether a web page associated with the URL resides in the predetermined node 300 of the distributed network 305. If so, the control continues to step S350. Otherwise, control jumps to step S370. At step S350, the web page is transmitted to the computer 110 via the transceiver 130. Then, at step S360, the web page is displayed on the display 140. Control then jumps to step S450, where the control routine ends.

At step S370, the control routine determines whether a directory page associated with the URL resides on the predetermined node 300. If such a directory page does not reside on the predetermined node 300, the control continues to step S380. Otherwise the control jumps to step S400 or step S425. At step S380, the predetermined node 300 transmits a "No Information Available" or similar message to the computer 110. Then, at step S390, the message is displayed on the display 140. The control routine then jumps to step S450.

At step S400, the directory page is transmitted to the computer 110 via the transceiver 130. Then, at step S410, the directory page is displayed on the display 140. Next, at step S420, a user links to the web page associated with the coordinate entry or a unique URL on the distributed network 305 via the "hyperlinked" reference page. Again, at step S350, the web page is transmitted to the computer 110 via the transceiver 130. Then, at step S360, the web page is displayed on the display 140. The control routine then continues to step S450.

In alternate embodiments, if the control routine determines at step S370 that the associated directory page resides on the predetermined node 300, the control can instead jump to step S425. At step S425, the directory page fetches the web page directly from a remote node of the distributed network 305 prior to being transmitted to the computer 110. This, again, can be accomplished by using the CGI script. By using this procedure, steps S400–S420 may be eliminated. In this alternate embodiment, the web page is transmitted to the computer 110 via the transceiver 130 at step S350 and displayed on the display 140 at step S360. The control routine ends at step S450.

In preferred embodiments, the bar code labels and infrared beacons may also use the method as disclosed in FIG. 7. That is, the bar code labels and infrared beacons may provide the location information system 100 with signals that are converted to coordinate entries. Also, the infrared beacons may be substituted with radio beacons, as described above.

As shown in FIGS. 1–6, the location information system 100 is preferably implemented on a programmed general purpose computer. However, the location information system can also be implemented on a special purpose computer, a programmed microprocessor or microcontroller and peripheral integrated circuit elements, an ASIC or other integrated circuit, a hardwired electronic or logic circuit such as a discrete element circuit, a programmable logic device such as a PLD, PLA, FPGA or PAL, or the like. In general, any device on which a finite state machine capable of implementing the flowcharts shown in FIGS. 7 and 8 can be used to implement the location information system 100. Further, it should be appreciated that the transceiver 130 connecting the predetermined node 300 and/or the distributed network 305 to the computer 110 can be a wired link to a network (not shown) as well as the illustrated wireless link. The predetermined node 300 and/or the distributed network 305 can be a local area network, a wide area network, an intranet, the Internet, or any other distributed processing and/or storage network. It may also be used with protocols such as the World Wide Web or any other protocol system. It is also appreciated from the above description that the predetermined node 300 and/or distributed network 305 can be either a local or remote node depending on a particular application.

As described above, while the system and method of this invention have been described with reference to coordinate data or a specific URL, the particular location can be identified by any sufficiently precise data set.

This invention has been described in detail with reference to preferred and alternate embodiments. It should be appreciated that the specific embodiments described above are merely illustrative of the principles underlying the inventive concept. It is therefore contemplated that various modifications of the disclosed embodiments will, without departing from the spirit and scope of the invention, be apparent to persons of ordinary skill in the art.

What is claimed is:

1. A location information system that displays location specific information, the location information system, comprising:
    a receiver that receives location identification information from at least one site specific object identifying a location; and
    a transceiver that transmits the location identification information to a distributed network and that receives the location specific information about the specified location from the distributed network based on the location identification information,
    wherein the location specific information provides information corresponding to the location.

2. The location information system of claim 1, further comprising a display that displays the location specific information.

3. The location information system of claim 1, wherein the location identification information includes at least one coordinate entry corresponding to the at least one site specific object.

4. The location information system of claim 3, wherein the at least one coordinate entry includes a latitude, a longitude, and an altitude entry.

5. The location information system of claim 1, wherein the location identification information resides on at least one of a local node and a remote node of the distributed network.

6. The location information system of claim 1, wherein the location identification information is associated with web pages having the location specific information residing thereon, the web pages residing on at least one of a local node and a remote node.

7. The location information system of claim 6, further comprising at least one directory page that resides on at least one of the local node and the remote node, the directory pages linking the location identification information to the web pages when the web pages reside on the remote node.

8. The location information system of claim 1, wherein:
    the at least one site specific object is a label associated with the specified location; and
    the receiver includes at least a scanner, the scanner reading the location identification information from the label.

9. The location information system of claim 8, wherein the location information includes one of a unique URL and a coordinate entry associated with the specified location.

10. The location information system of claim 8, wherein:
    the specified location is a particular document, the label is affixed to the particular document, and
    the location specific information being information about the particular document.

11. The location information system of claim 10, wherein the information about the particular document is an electronic version of the particular document.

12. The location information system of claim 8, wherein the label is selected from the group consisting of a vericode label, a bar code label, a printed label, an RF tag and a two dimensional bar code label.

13. The location information system of claim 1, wherein:
    the at least one site specific object is a low-range electromagnetic transmitter transmitting an electromagnetic signal on a predetermined frequency, the electromagnetic signal containing the location identification information, the electromagnetic transmitter associated with the specified location, and the receiver includes at least an electromagnetic receiver tuned to the predetermined frequency, the receiver receiving the electromagnetic signal.

14. The location information system of claim 13, wherein the location identification information includes one of a unique URL and a coordinate entry associated with the specified location.

15. The location information system of claim 13, wherein:

the electromagnetic transmitter is one of an infrared transmitter and a radio frequency transmitter, and the receiver is a corresponding one of an infrared receiver and a radio frequency receiver.

16. A location information system that provides location specific information, the location information system comprising:

location receiving means for receiving location identification information from at least one site specific object identifying a location; and transmitting means for transmitting the location identification information to a distributed network and for receiving location specific information from the distributed network corresponding to the location identification information, wherein the location specific information provides information corresponding to the location.

17. The location information system of claim 16, wherein the location identification information is one of a coordinate entry and a unique URL associated with the location specific information.

18. The location information system of claim 16, further comprising displaying means for displaying the location specific information.

19. The location information system of claim 16, wherein the location identification information resides on at least one of a local node and a remote node of the distributed network.

20. The location information system of claim 16, wherein the location identification information is associated with at least one web page, the web pages containing the location specific information and residing on at least one of a local node and a remote node.

21. The location information of claim 20, further comprising linking means for linking the location identification information to the web pages when the web pages reside on the remote node, the linking means residing on at least one of the local node and the remote node.

22. The location information of claim 16, wherein the location receiving means includes at least one of a bar code scanner and an infrared beacon interface, the at least one of the bar code scanner and the infrared beacon interface sensing the location identification information.

23. The location information system of claim 22, wherein the location specific information includes one of a unique URL and a coordinate entry associated with the location identification information.

24. A method of receiving location information about a specified location comprising:

receiving location identification information from at least one site specific object identifying the specific location;

transmitting the location identification information to a distributed network where the location specific information resides; and receiving the location specific information associated with the location identification information from the distributed network wherein the location information provides information corresponding to the location.

25. The method of claim 25, further comprising displaying the location information on a display.

26. The method of claim 24, wherein the location information resides on at least one web page.

27. The method of claim 24, further comprising:

linking the location identification information to at least one web page that resides on a remote node of the distributed network, the linking page residing on at least one of a local node and the remote node of the distributed network.

28. The method of claim 24, further comprising:

receiving a unique URL associated with the location identification information;

transmitting the unique URL to the distributed network; and receiving web pages associated with the unique URL from the distributed network, the web pages including the location specific information.

* * * * *